United States Patent
Knopf et al.

(10) Patent No.: US 11,483,976 B2
(45) Date of Patent: Nov. 1, 2022

(54) GRIPPER TOOLS FOR OBJECT GRASPING AND MANIPULATION

(71) Applicant: APPHARVEST TECHNOLOGY, INC., Morehead, KY (US)

(72) Inventors: Ryan R. Knopf, Morehead, KY (US); Joshua Aaron Lessing, Morehead, KY (US); Jason A. Chrisos, Morehead, KY (US)

(73) Assignee: AppHarvest Technology, Inc., Morehead, KY (US)

( * ) Notice: Subject to any disclaimer, the term of this patent is extended or adjusted under 35 U.S.C. 154(b) by 0 days.

(21) Appl. No.: 17/430,770

(22) PCT Filed: Feb. 14, 2020

(86) PCT No.: PCT/US2020/018392
§ 371 (c)(1),
(2) Date: Aug. 13, 2021

(87) PCT Pub. No.: WO2020/168261
PCT Pub. Date: Aug. 20, 2020

(65) Prior Publication Data
US 2022/0161447 A1    May 26, 2022

Related U.S. Application Data (60) Provisional application No. 62/806,491, filed on Feb. 15, 2019.

(51) Int. Cl.
*A01D 46/30* (2006.01)
*A01D 45/00* (2018.01)
(Continued)

(52) U.S. Cl.
CPC .......... *A01D 46/30* (2013.01); *A01D 45/006* (2013.01); *A01D 45/008* (2013.01); *A01D 46/24* (2013.01);
(Continued)

(58) Field of Classification Search
CPC .... A01D 45/006; A01D 45/008; A01D 45/24; A01D 45/30; B25J 15/10; B25J 11/0045; B25J 15/00–12
See application file for complete search history.

(56) References Cited

U.S. PATENT DOCUMENTS 1,375,580 A * 4/1921 Fisher ............... A47J 45/10
   294/33
5,544,474 A * 8/1996 Finkelstein ........... A01D 46/30
   56/10.2 A (Continued)

FOREIGN PATENT DOCUMENTS

CN   205902411 U     1/2017
CN   108271532 A *   7/2018 ........... A01D 46/30
(Continued)

OTHER PUBLICATIONS

Meet the Kompano!' (PRIVAALL) Jun. 14, 2016 (Jun. 14, 2016), [online] retrieved from< URL: https:/lwww.youtube.com/watch?v=mZpL264-rm8 >.
(Continued)

*Primary Examiner* — Adam J Behrens
(74) *Attorney, Agent, or Firm* — Benesch, Friedlander, Coplan & Aronoff, LLP (57) ABSTRACT

A harvesting tool configured to independently grasp and twist a target object. The harvesting tool comprising a pneumatic cylinder, a pneumatic coupling communicating with the pneumatic cylinder; bearings supporting the pneumatic cylinder for rotation relative to the pneumatic cou-
(Continued)

pling; and a gear assembly configured to rotate the pneumatic cylinder relative to the pneumatic coupling. Related systems and methods are also disclosed.

32 Claims, 5 Drawing Sheets (51) Int. Cl.
*A01D 46/24* (2006.01)
*B25J 9/04* (2006.01)
*B25J 15/10* (2006.01)
*B25J 15/12* (2006.01)

(52) U.S. Cl.
CPC ............... *B25J 9/04* (2013.01); *B25J 15/10* (2013.01); *B25J 15/12* (2013.01)

(56) References Cited

U.S. PATENT DOCUMENTS

| | | | | |
|---|---|---|---|---|
| 5,895,084 | A * | 4/1999 | Mauro | B25J 15/12 294/100 |
| 9,554,512 | B2 | 1/2017 | Davidson et al. | |
| 10,307,913 | B2 * | 6/2019 | Azazi | B25J 15/024 |
| 10,464,217 | B1 * | 11/2019 | Phan | B25J 15/10 |
| 2014/0159399 | A1 * | 6/2014 | Peralo | A63B 60/06 294/99.2 |
| 2015/0257839 | A1 * | 9/2015 | Vause | F21L 4/00 606/130 |
| 2016/0073584 | A1 * | 3/2016 | Davidson | A01D 46/30 294/198 |
| 2016/0375590 | A1 | 12/2016 | Lessing et al. | |
| 2017/0105346 | A1 * | 4/2017 | Davidson | A01D 46/30 |
| 2018/0049371 | A1 | 2/2018 | Pitzer | |
| 2019/0030711 | A1 * | 1/2019 | Azazi | B25J 15/10 |
| 2019/0387678 | A1 | 12/2019 | Knopf et al. | |
| 2020/0128744 | A1 * | 4/2020 | Avigad | B25J 9/0093 |
| 2021/0323174 | A1 * | 10/2021 | Salisbury | A01D 46/24 |

FOREIGN PATENT DOCUMENTS

| | | |
|---|---|---|
| CN | 108738711 A | 11/2018 |
| GB | 2202724 | 10/1988 |
| WO | 2018015416 | 1/2018 |

OTHER PUBLICATIONS

Cucumber harvesting robot' (Wur Glastuinbouw) Jan. 29, 2013 (Jan. 29, 2013), [online] retrieved from< URL : https://www.youtube.com/watch?v=EiQG4zhMHLM >.

Root AI—Introducing Virgo' (ROOT AI) May 13, 2019 (May 13, 2019), [online] retrieved from <URL: https:/lwww.youtube.com/watch?v=X1XSGqvP-A8>.

Yaguchi, et al. "Development of an autonomous tomato harvesting robot with rotational plucking gripper," 2016 IEEE/RSJ International Conference on Intelligent Robots and Systems (IROS), 2016, pp. 652-657.

* cited by examiner

GRIPPER TOOLS FOR OBJECT GRASPING AND MANIPULATION

TECHNICAL FIELD

Aspects disclosed herein relate generally to robotic object grasping and manipulation.

BACKGROUND

Agricultural technology is a sector of significant commercial interest. Examples of some emerging agricultural technologies pertain to automated farming tools for crop care and irrigation. Automation of harvesting operations poses significant challenges.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with one or more embodiments, robotic grasping and manipulation tools are disclosed along with related systems and methods.

In accordance with one or more embodiments, a target object may be strategically grasped and manipulated, for example, to facilitate harvesting thereof. In some embodiments, a target object may be picked in place, i.e. from a target surface or a target location. In at least some embodiments, the target object may be gripped and twisted so as to dislodge the target object in place. In various embodiments, a grasped and/or dislodged target object may be removed from an environment, i.e. an agricultural environment. In at least some embodiments, a tool may be configured to independently grasp and twist the target object. A common actuation mechanism may be used to accomplish a wide variety of motions, force application profiles, and handling of different target objects via select interchangeable components. Beneficially, the number of components in contact with the target object may be minimized to facilitate cleaning and to promote sanitized operation. The tools described herein can be constructed of materials compatible with various industry and regulatory safety standards.

In accordance with one or more embodiments, a wide variety of target objects may serve as an intended workpiece. Target objects may vary in terms of their size, geometry, firmness, and various other properties. In some embodiments, the target object may generally be characterized as delicate or otherwise easily crushable. In at least some embodiments, the target object may pertain to agricultural produce, e.g. the target object may be a fruit or a vegetable. In some specific non-limiting embodiments, the target object may be a tomato, pepper, or cucumber.

In accordance with one or more embodiments, a target object may be present in a variety of environments or settings. In some embodiments, the target object may be in an agricultural environment. In other embodiments, the target object may be in an industrial environment. The environment or setting of the target object may be indoors or outdoors. In some embodiments, the target object may generally be loose in the target environment. In other embodiments, the target object may be attached or tethered such as to a host in the target environment. For example, a target object may pertain to agricultural produce on a plant, e.g. a vine, for ripening.

In accordance one or more embodiments, a harvesting tool may be used to perform one or more of the following functions with respect to a target object: grasping, dislodgment, and/or removal. A target object may be enveloped and grasped. If required, a grasped target object may generally be dislodged in place via a twisting operation. For example, a target object may be a tomato on a vine. The tomato may be grasped and dislodged from the calyx of the vine via twisting. In other embodiments, dislodgment may not be necessary. Removal or repositioning of the grasped target object relative to the environment may be desired.

FIGS. 1A-1D present a schematic of a representative but non-limiting operational permutation. A target object may be grasped at Step 1, twisted in place at Step 2, and removed from the surrounding environment at Step 3. In at least some embodiments, grasping and twisting may be performed independently.

Figure 4:
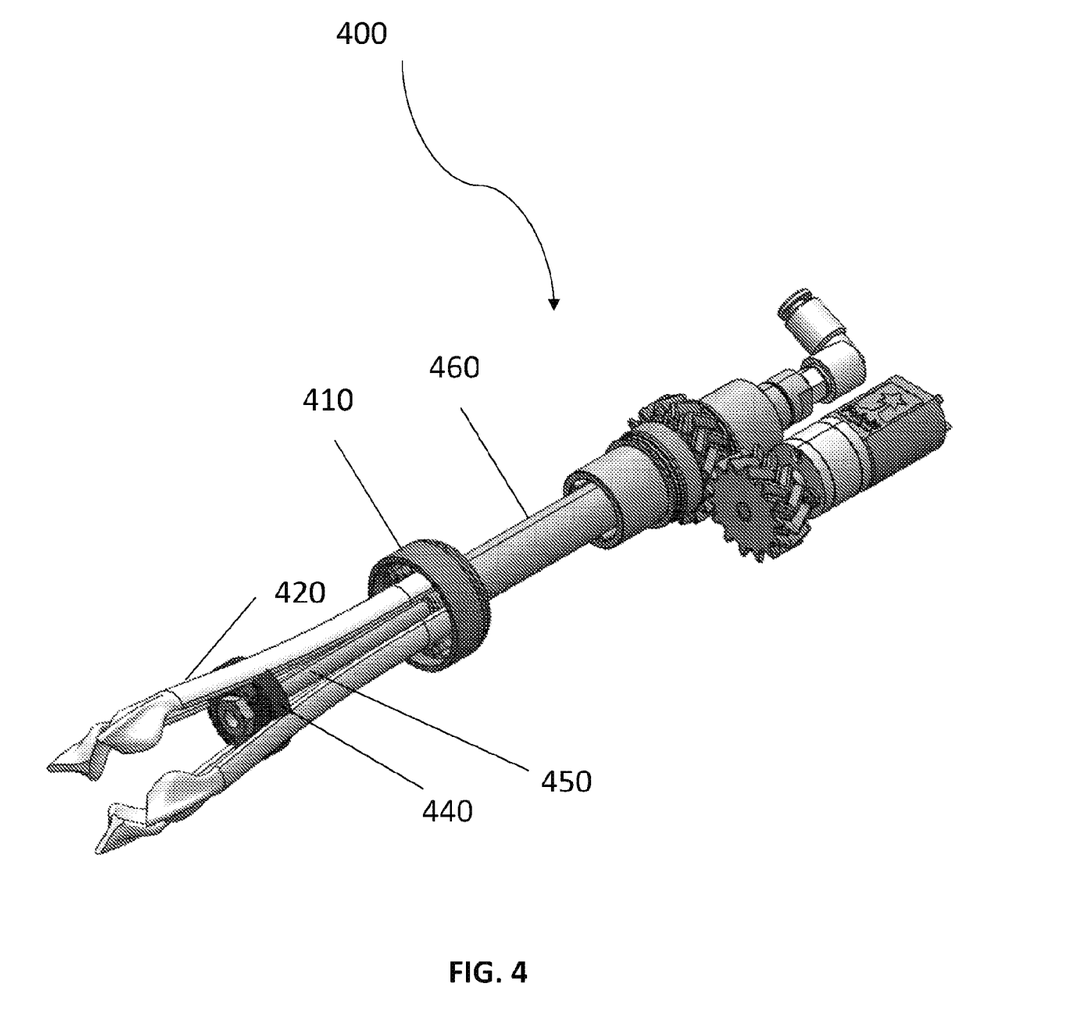
FIG. 4 presents a schematic of a harvesting tool in accordance with one or more embodiments.

In accordance with one or more embodiments, a harvesting tool may generally include a rotatable cylinder to facilitate dislodgment or separation of a target object via twisting. A workhead may be attached at a distal end of the rotatable cylinder. The workhead may therefore generally rotate as an assembly with the cylinder upon rotational actuation of the cylinder. In some embodiments, the rotatable cylinder is a pneumatic cylinder supported on one or more bearings. A gear associated with a motor, e.g. a DC motor, may be configured to spin the rotatable cylinder. Some of these features are illustrated in FIG. 4. The gear may hold the rotatable cylinder with an internal taper. The workhead may be interchangeable with respect to the rotatable cylinder so as to accommodate target objects of varying sizes and/or requirements. Rotational motion of the cylinder may also facilitate fine positioning the workhead in terms of its angular orientation with respect to a target object or related environment.

Figure 1A:
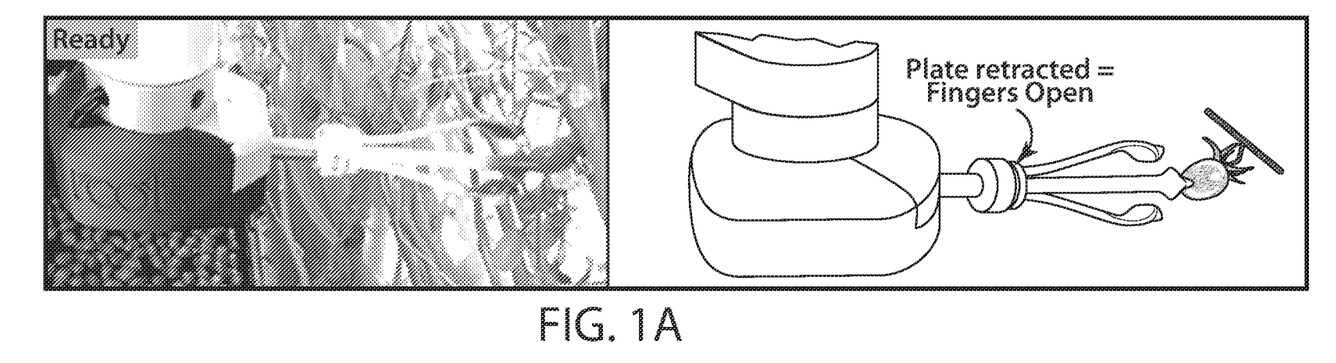
FIGS. 1A-1D present a process control cycle for harvesting a target object in accordance with one or more embodiments.
Figure 1B:
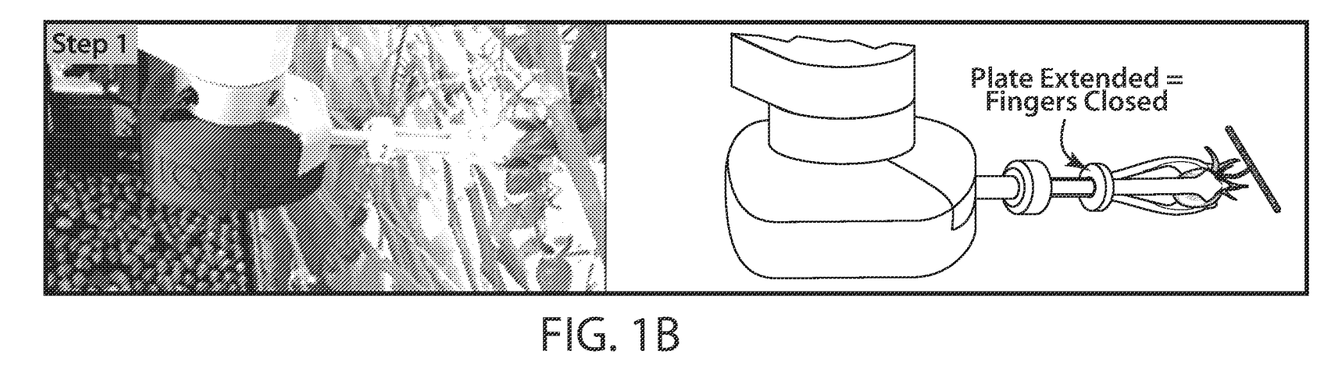
Figure 1C:
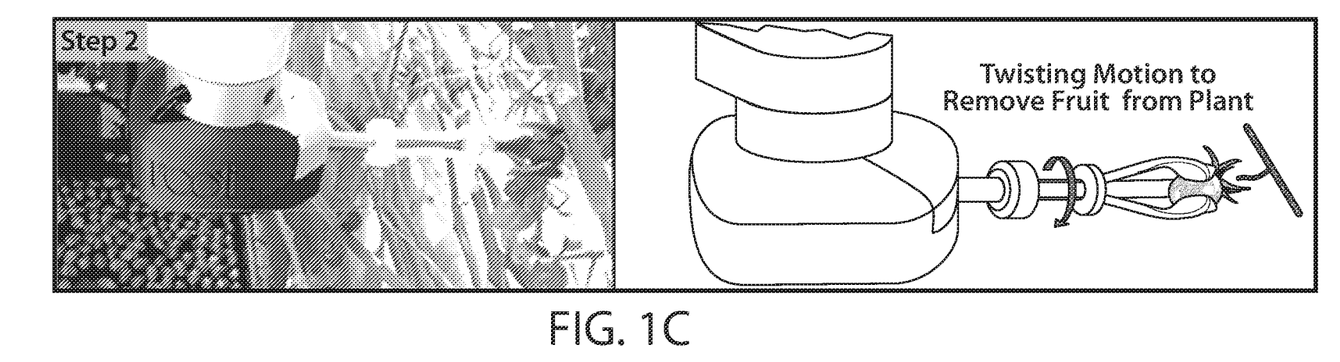
Figure 1D:
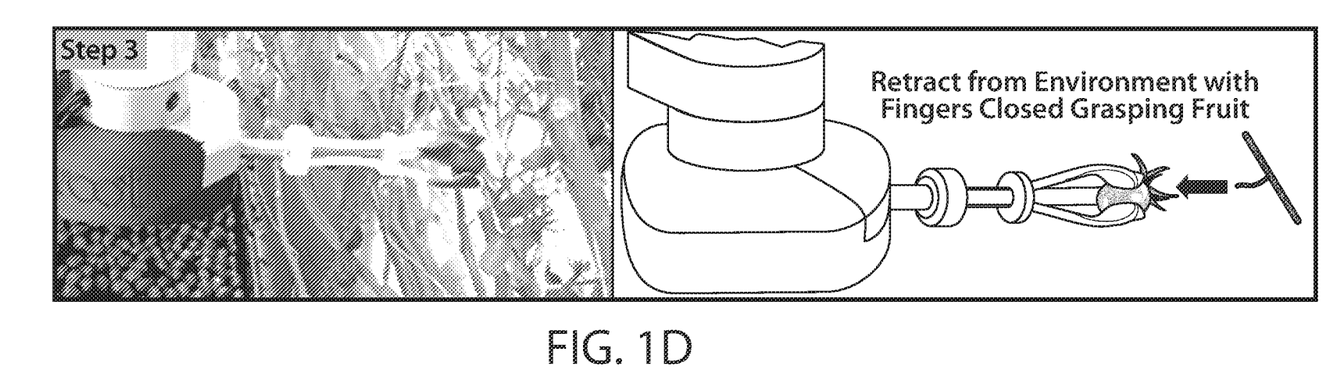
Figure 2:
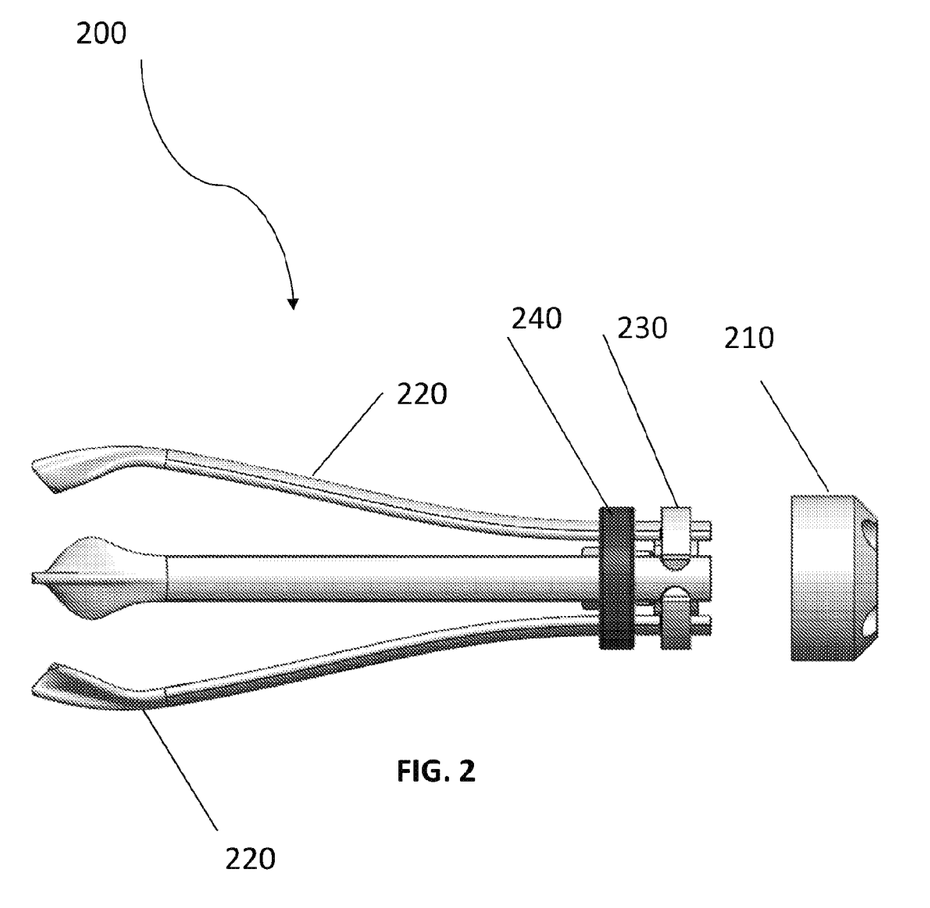
FIG. 2 presents an exploded view of a workhead of a harvesting tool in accordance with one or more embodiments.

In accordance with one or more embodiments, the workhead may generally provide a grasping mechanism. In some embodiments with reference to FIG. 2, workhead 200 may include a barrel 210 and a plurality of grasping elements 220. In at least some embodiments, the plurality of grasping elements may be a plurality of finger elements. The plurality of finger elements may extend radially from the barrel. The plurality of finger elements may be keyed for assembly and/or to be retained within a holder 230 of the workhead. Collar 240 is discussed below. The plurality of finger elements may be constructed and arranged to envelop a target object as described herein. The barrel may be fixed relative to the rotatable cylinder such that the workhead turns with the rotatable cylinder. Rotation of the rotatable cylinder may also adjust an angular orientation of the plurality of finger elements in a target environment.

Figure 3A:
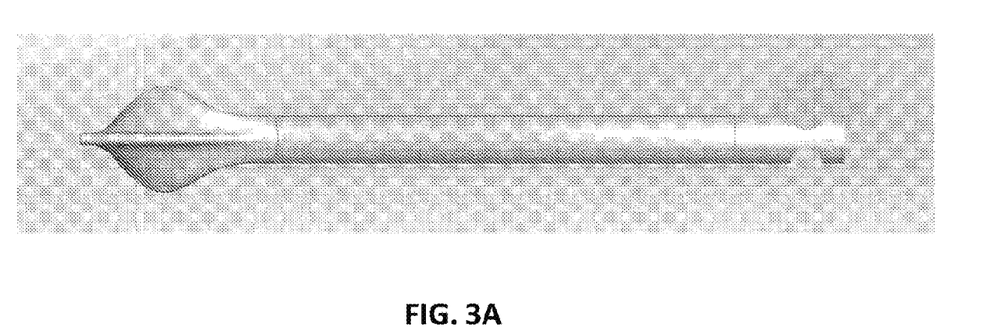
FIGS. 3A-3C illustrate features of various gripping finger elements in accordance with one or more embodiments.
Figure 3B:
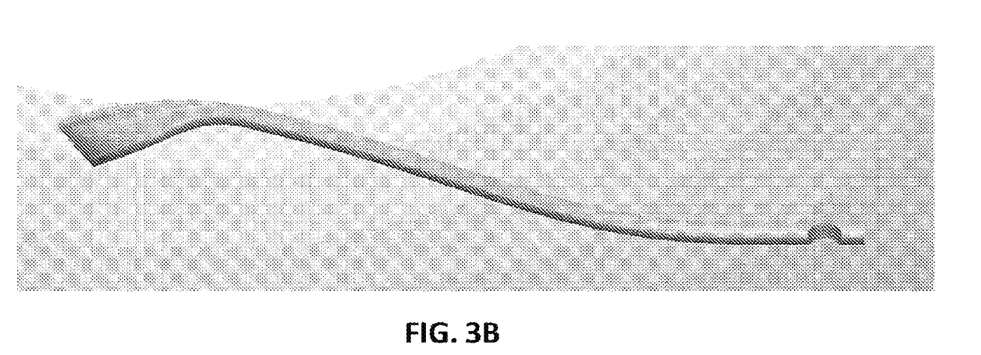
Figure 3C:
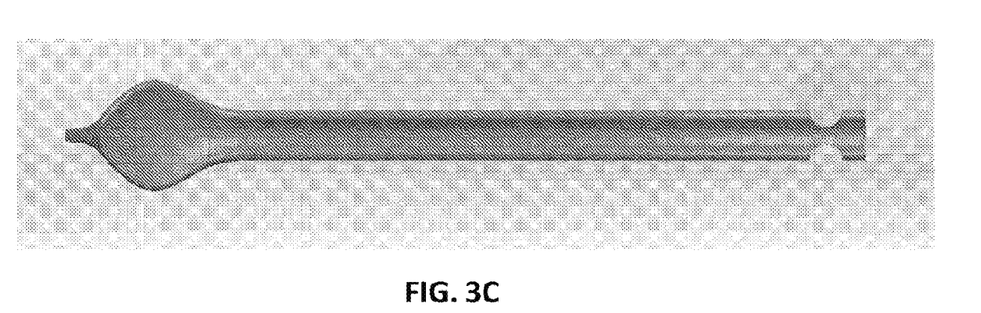

In accordance with one or more embodiments, the plurality of finger elements may be configured to accommodate one or more requirements associated with a target object. The plurality of finger elements may separately be configured to accommodate one or more requirements associated with an environment of the target object, e.g. an agricultural environment. The plurality of finger elements may include any number of finger elements, e.g. one, two, three, four, five, six or more finger elements. In some embodiments, the plurality of finger elements may be jointed to facilitate grasping of the target object. In other embodiments, the plurality of finger elements may be contoured to facilitate grasping of the target object. In at least some embodiments, the plurality of finger elements may include a conformable feature and/or an engagement surface to facilitate grasping of the target object. As illustrated in FIGS. 3A and 3B, a raised spine may advance forward of the gripping surface to provide a low cross-section area for enhanced mobility in some non-limiting embodiments. Such a feature may also provide a forward surface capable of a palming grasp on the target object. As further illustrated, the curvature and opening size may generally correlate to the size of a target object. The ratio of the support distance from the cylinder centerline to the further beam profile distance may generally determine clamping motion control in terms of speed, acceleration, and overall distance to clamp down. The plurality of finger elements may be characterized by a beam stiffness value which correlates to a desired force to be applied to the target object. As illustrated in FIG. 3C, beam stiffness may be tuned using a 'c' profile to reduce material thickness and to increase the stiffness to weight ratio. The grasping mechanism may generally be dexterous.

In accordance with one or more embodiments, with reference to FIG. 4, the workhead may further include a collar 440 which generally encompasses the plurality of finger elements 420. The barrel may, in part, hold the plurality of finger elements in contact with the collar. The collar 440 may be configured to influence grasping of a target object by the plurality of finger elements 410. In this regard, the collar 440 may be movable along a length of the plurality of finger elements. In some embodiments, the collar 440 may be characterized by a ramp angle value which correlates to a desired force to be applied to the target object. In at least some embodiments, the collar may be characterized by a deflection value which correlates to a desired force to be applied to the target object.

In accordance with one or more embodiments, the workhead may still further include an extendable rod 450. The extendable rod 450 may generally be configured to facilitate motion of the collar along the length of the plurality of finger elements. The extendable rod 450 may be housed within the rotatable cylinder 460 at a first end and connected to the collar at a second end. The collar 440 may be threaded on the second end of the extendable rod 450. In operation, the extendable rod may cooperate with the collar such that actuation of the extendable rod in an outward direction relative to the barrel may force the plurality of finger elements together to grasp the target object. Alternatively, the extendable rod may cooperate with the collar such that actuation of the extendable rod in an inward direction relative to the barrel may force the plurality of finger elements together to grasp the target object.

In some embodiments, the collar may generally serve as a pusher such that the collar contracts the plurality of finger elements as the extendable rod is actuated. A slot angle associated with the collar may ease translation of axial to radial loading. A target object may be grasped to varying degrees by the plurality of finger elements. In some embodiments, the target object may be substantially grasped while in other embodiments a palming or partial grasp may be sufficient to effect dislodgment and/or removal of the target object.

In accordance with one or more embodiments, the harvesting tool may be configured to actuate the rotatable cylinder independently of the workhead. In some embodiments, the harvesting tool may be configured to twist the rotatable cylinder independently of actuation of the extendable rod. The harvesting tool may be configured to dislodge the target object from a plant, e.g. a vine, without damaging the plant. Dislodging may be performed in place. Removal of the target object from an environment may follow. Such separation of a target object from a host may beneficially be accomplished cleanly without damage to the host and with relatively low force application. The harvesting tool may be configured to grasp the target object while substantially avoiding environmental obstructions. The harvesting tool may be configured to exert a level of force on the target object that is below a threshold level, e.g. so as to avoid damaging the target object.

In accordance with one or more embodiments, the workhead may include a further feature to facilitate grasping and/or removal of a target object. For example, a deformable member may bridge the plurality of finger elements to facilitate harvesting operations.

In accordance with one or more embodiments, a harvesting tool may be removably receivable by a robotic arm. The robotic arm may be attached to a robotic carriage or a robotic manipulator as part of a robotic harvesting system. In some embodiments, two or more harvesting tools may be removably receivable by a single robotic arm. In other embodiments, each robotic arm of a robotic harvesting system may have a dedicated harvesting tool. In still other embodiments, two or more robotic arms of a robotic harvesting system may each have two or more dedicated harvesting tools. In some embodiments, a robotic harvesting system may include at least one sensor associated with a harvesting tool, robotic arm, and/or other component. In at least one embodiment, a robotic harvesting system can include two or more robotic carriages or manipulators.

In accordance with one or more embodiments, a robotic manipulator may allow for customized motion, travel, and/or force profiles during actuation of a related robotic arm and/or harvesting tool. In at least some embodiments, a robotic manipulator may be calibrated.

In accordance with one or more embodiments, the robotic harvesting system may include a processor programmable to visualize an environment and/or a target object. The processor may be programmable to discern one or more properties of a target object, i.e. its relative positioning and/or its dimensions. The processor may be programmable to identify and/or locate a target object within an environment. The processor may be programmable to estimate ripeness of a target object.

In accordance with one or more embodiments, a robotic harvesting system may include a controller programmable to operate a robotic arm. The controller may be further programmable to operate the harvesting tool. The controller may be associated with the robotic carriage or manipulator. The controller may receive input from the processor and provide one or more control signals to the robotic arm and/or harvesting tool.

In some embodiments, the controller may be programmable to actuate the robotic arm in order to strategically position the harvesting tool within an environment. In this way, the workhead and/or its plurality of finger elements may be placed in proximity of a target object to facilitate harvesting thereof. The controller may manipulate the robotic arm such that the plurality of finger elements of the workhead envelops a target object, either partially or completely. The controller may be programmable to actuate the extendable rod of the harvesting tool to achieve grasping of the target object by the plurality of finger elements. The controller may be programmable to achieve a predetermined degree of closing of the plurality of finger elements. The predetermined degree of closing may correlate to at least one parameter of the target object, for example, a size or a geometry of the target object. As with enveloping, varying degrees of grasping of a target object are achievable. Once the target object is grasped, the controller may be programmable to actuate the rotatable cylinder in order to dislodge the target object in place, e.g. by twisting. The controller may be programmable to remove or relocate a grasped target object, either environmentally free or expressly dislodged. The controller may be further programmable to release and/or otherwise deliver a target object to a desired location, such as for storage or downstream processing.

In accordance with one or more embodiments, the controller may be programmable to operate various components of the robotic harvesting system at variable speeds. For example, a robotic arm, rotatable cylinder, and/or an extendable rod of a harvesting tool workhead may be strategically operated at variable speeds.

In accordance with one or more embodiments, a robotic harvesting system may be programmed to operate a robotic arm and/or harvesting tool according to customizable routines. For example, in some non-limiting embodiments a system may sequentially envelop, grasp, detach, and remove a target object from an environment.

In accordance with one or more embodiments, a method of harvesting a target object may generally involve enveloping the target object, such as with a plurality of finger elements. The target object may then be grasped with the plurality of finger elements. A twisting motion may then be used to dislodge the grasped target object in place. Grasping of the target object may be performed independently of dislodging the grasped target object. The grasped target object may then be removed and/or released from the environment. For example, the target object may be released and/or delivered to a downstream process. The target objected may be enveloped, grasped, dislodged, and removed in series in some non-limiting embodiments. Environmental obstructions, i.e. other target objects, vines, and/or leaves, may be substantially avoided during the harvesting operation.

In some embodiments, a target object may be identified, located, and/or characterized. At least one characteristic of the plurality of finger elements may be selected based on at least one parameter associated with the target object and/or related environment. An angular orientation of the plurality of fingers elements may be adjusted. Ripeness of the target object may be assessed. A force level that is less than a threshold level may be exerted on the target object.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A harvesting tool, comprising:
   a pneumatic cylinder;
   a barrel attached to a distal end of the pneumatic cylinder;
   a plurality of finger elements radially attached to the barrel, the plurality of finger elements constructed and arranged to envelop a target object;
   a collar encompassing the plurality of finger elements, the collar movable along a length of the plurality of finger elements;
   an extendable rod housed within the pneumatic cylinder at a first end and connected to the collar at a second end, the extendable rod configured to facilitate motion of the collar along the length of the plurality of finger elements whereby, in operation, the extendable rod cooperates with the collar such that actuation of the extendable rod in an outward direction relative to the barrel forces the plurality of finger elements together to grasp the target object;
   a pneumatic coupling communicating with the pneumatic cylinder;
   bearings supporting the pneumatic cylinder for rotation relative to the pneumatic coupling; and
   a gear assembly configured to rotate the pneumatic cylinder relative to the pneumatic coupling.

2. The tool of claim 1, wherein the barrel is fixed relative to the rotatable cylinder.

3. The tool of claim 1, wherein the harvesting tool is configured to twist the rotatable cylinder independently of actuation of the extendable rod.

4. The tool of claim 1, wherein the barrel including the plurality of finger elements is interchangeable with respect to the rotatable cylinder.

5. The tool of claim 1, wherein the plurality of finger elements comprises two, three, four, five, six or more finger elements.

6. The tool of claim 1, wherein the plurality of finger elements is characterized by a beam stiffness value which correlates to a desired force to be applied to the target object.

7. The tool of claim 1, wherein the plurality of finger elements are contoured to facilitate grasping of the target object.

8. The tool of claim 1, wherein the plurality of finger elements comprise a conformable feature and/or an engagement surface to facilitate grasping of the target object.

9. The tool of claim 1, further comprising at least one sensor.

10. The tool of claim 1, wherein the pneumatic cylinder is configured to adjust an angular orientation of the plurality of finger elements.

11. The tool of claim 1, wherein the harvesting tool is configured to exert a level of force on the target object that is below a threshold level.

12. The tool of claim 1, wherein the harvesting tool comprises a deformable member bridging the plurality of finger elements.

13. The tool of claim 1, wherein the harvesting tool is removably receivable by a robotic arm.

14. The tool of claim 1, wherein the target object pertains to agricultural produce and/or is located in an agricultural environment.

15. The tool of claim 1, wherein the target object is a tomato, pepper, or cucumber.

16. The tool of claim 1, wherein the harvesting tool is configured to remove the target object from a vine.

17. The tool of claim 1, wherein the harvesting tool is configured to grasp the target object while substantially avoiding obstructions.

18. A harvesting system, comprising:
a robotic arm; and
the harvesting tool of claim 1 operatively attached to the robotic arm.

19. The system of claim 18, further comprising a controller programmable to operate the robotic arm and/or the harvesting tool.

20. The system of claim 18, further comprising a processor programmable to identify and/or locate the target object.

21. The system of claim 18, further comprising a processor programmable to estimate ripeness of the target object and/or to visualize an environment of the target object.

22. The system of claim 18, further comprising a controller programmable to position the plurality of finger elements in proximity of the target object to facilitate harvesting thereof.

23. The system of claim 18, further comprising a controller programmable to actuate the extendable rod to achieve a predetermined degree of closing of the plurality of finger elements.

24. The system of claim 18, further comprising a controller programmable to actuate the extendable rod and/or the pneumatic cylinder at a variable speed.

25. The system of claim 18, further comprising a controller configured to release the target object, place the target object at a desired location and/or to deliver the target object to a downstream process.

26. The system of claim 18, further comprising a controller configured to manipulate the harvesting tool to sequentially envelop, grasp, detach, and remove the target object from an environment.

27. The system of claim 26, wherein the controller is configured to be calibrated.

28. The tool of claim 1, wherein the gear assembly is operatively engaged with the pneumatic cylinder at a proximal end of the pneumatic cylinder.

29. The tool of claim 1, wherein the pneumatic coupling is located proximately relative to a proximal end of the pneumatic cylinder.

30. The tool of claim 1, wherein the gear assembly provides the pneumatic cylinder with a range of rotation greater than 360 degrees.

31. The tool of claim 1, wherein the plurality of finger elements include a finger element having a proximal end portion attached to the barrel, and a stem portion reaching longitudinally from the proximal end portion to a distal fee end portion, wherein the distal free end portion is wider than the stem portion, has an inner surface with a concave contour configured for engagement with the target object, an outer surface with a convex contour, and a raised spine reaching longitudinally along the outer surface.

32. The tool of claim 31, wherein the outer surface and the raised spine reach distally beyond the inner surface.

* * * * *